Jan. 16, 1951  G. E. CANTIN, JR  2,537,965
LIQUID FILTER AND PURIFIER
Filed April 23, 1948
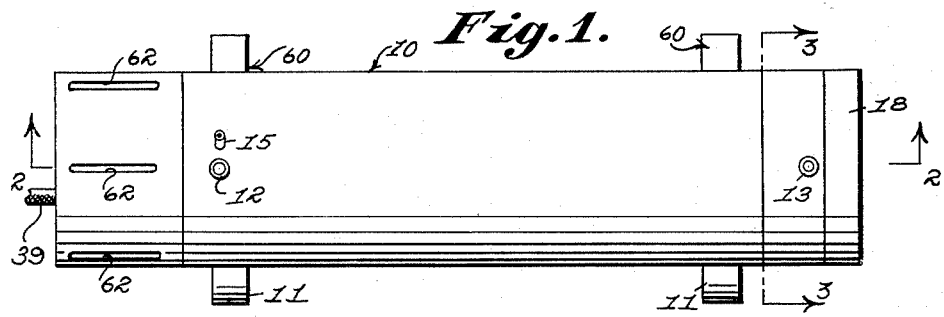
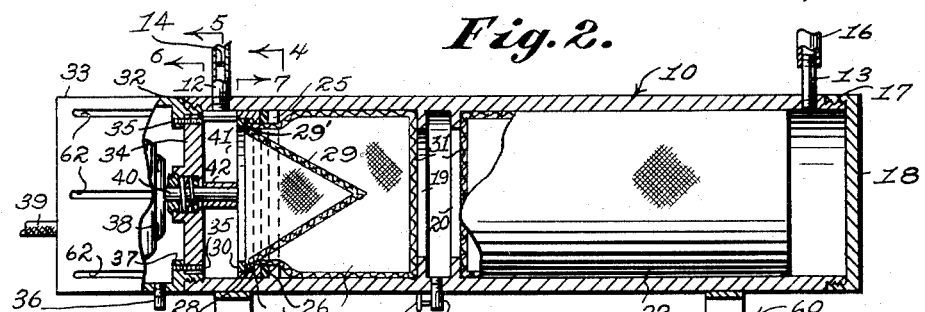
INVENTOR.
Gaston E. Cantin, Jr
BY
McMorrow, Berman & Davidson
ATTORNEYS Patented Jan. 16, 1951

2,537,965

UNITED STATES PATENT OFFICE 2,537,965

LIQUID FILTER AND PURIFIER

Gaston Edward Cantin, Jr., Poughkeepsie, N. Y.

Application April 23, 1948, Serial No. 22,891

2 Claims. (Cl. 210—165)

My invention relates to liquid filters and/or purifiers, wherein a body of liquid to be filtered is forced through one or more filter units for purification. The device according to the invention is particularly applicable to the filtering and/or purifying of a liquid contained in a tank or the like, and which is used for some time without being replaced, and wherein liquid from the tank is pumped through one or more filter units and discharged therefrom back into the tank for re-use. While not so limited, such filter and/or purifier is particularly adaptable to use with open-topped aquariums.

With the foregoing in view, an object of my invention is to provide an improved liquid filter and purifier.

A further object is to provide an improved liquid filter and purifier which comprises a casing open at opposite ends and mounting therein one or more replaceable filter units, inlet and outlet openings on opposite sides of said units, and pump means operatively associated with one of the openings for circulating a liquid to be filtered through the filter units.

A further object is to provide in an improved filter such as that last described means for heating fluid drawn through the filter prior to its discharge therefrom.

A further object is to provide an improved filter and/or purifier which comprises a casing mounting a power-driven pump means for circulating fluid through the casing, replaceable filter units carried by the casing, and means for supporting the casing on a container for a body of liquid to be filtered.

Other objects and advantages reside in the particular structure of the invention, the particular elements comprising the same, combination and arrangement of the several elements, and will be readily understood by those skilled in the art upon reference to the attached drawing in connection with the following specification, wherein the invention is shown, described and claimed.

In the drawing:

Figure 1 is a plan view of a preferred form of the invention;

Figure 2 is a longitudinal vertical sectional view taken substantially on the plane of the line 2—2 of Figure 1, parts being shown in elevation;

Figure 3 is a transverse vertical sectional view taken substantially on the plane of the line 3—3 of Figure 1;

Figure 4 is a transverse vertical sectional view taken substantially on the plane of the line 4—4 of Figure 2;

Figure 5 is a transverse vertical sectional view taken substantially on the plane of the line 5—5 of Figure 2;

Figure 6 is a transverse vertical sectional view taken substantially on the plane of the line 6—6 of Figure 2;

Figure 7 is a transverse vertical sectional view taken substantially on the plane of the line 7—7 of Figure 2;

Figure 8 is a longitudinal vertical sectional view showing a modified form of closure gap for use with the device according to the invention.

Referring specifically to the drawing, wherein like reference characters have been used throughout the several views to designate like parts, 10 designates a cylindrical casing open at both ends and formed with a central axial passage therethrough. The casing is provided with a pair of laterally-directed hooks 11 which are longitudinally spaced adjacent opposite ends of the casing and which provide means for supporting the casing from a suitable base, such as the rim of a tank or aquarium, not shown. The hooks 11 may comprise extensions of cradles 60 in which the casing 10 is detachably seated and which includes flat bases 61 adapted to support the casing on a horizontal surface. One end of the casing 10 is provided with an inlet opening defined by a tubular nipple 12 which is adapted to be detachably connected to a suitable tubular conduit, not shown, for supplying liquid to the casing. The inlet nipple 12 may include a removable screen 14 to prevent passage of large objects. The opposite end of the casing 10 is likewise provided with an outlet opening defined by a tubular nipple 13 which is adapted to be detachably connected to any suitable conduit 16, Figure 2, for the discharge of filtered liquid from the casing. A second nipple 15 is provided at the inlet end of the casing 10 adjacent the inlet nipple 12. Such nipple 15 is adapted for the introduction of air into the liquid when it is desired to aerate the liquid and may be used likewise for the introduction of a disinfectant, such as chlorine, into the liquid, prior to its filtration.

Intermediate the nipples 12 and 13, the interior of the casing 10 is formed with a pair of longitudinally-spaced and radially inwardly-directed annular ribs 19 and 20, which provide a relatively narrow sediment space or trap therebetween. The outer sides of the ribs 19 and 20 provide seats for replaceable filter units 21 and 22 which may comprise fabric bags containing suitable sands, charcoal, or the like, for filtering and/or purifying liquid passing therethrough. The sediment chamber or trap is drained by a suitable clean-out port comprising a nipple 23 closed by any suitable manually-operated valve 24. While the filter unit 22 is shown as comprising a single cloth sack, it is obvious that the same could comprise two or more similar sacks of lesser length, each containing a different form of filtering and/or purifying material. As is readily apparent, from Figures 1 and 2, the filter unit or units 22 may be readily removed from the casing 10 upon unscrewing of the closure cap 18 at the outlet end of the casing. However, the ribs 19 and 20 prevent ready removal of the forward filter unit 21, so the same must be accessible from the opposite end of the casing, the structure of which will now be described.

A radially inwardly-extending annular rib 25 is formed on the interior of the casing 10 inwardly adjacent the inlet nipple 12. Such rib 25 provides a seat on its outer surface for a sealing washer 26 which in turn has seated thereon a flanged washer 28. The cloth material defining the filter unit 21 is radially outwardly-directed, as at 27, over the flange of the ring 28 and retained therein by a like flange 29' of a conical screen 29. The flange 29' of the screen 29 is correspondingly held in place by a flat washer 30. In practice, the filter unit 21, together with the screen 29, flat ring 30 and flanged ring 27, are attached together as a unit and inserted and withdrawn from the inlet end of the casing 10.

In this connection, it should be noted that the ends of all the filter units are defined by porous screens 31 in any suitable nature with the exception of the forward end of the forward filter unit 21, which, as aforesaid, is defined by the conical screen 29.

The inlet end of the casing is threaded, as at 32, for threaded engagement with a closure for that end which comprises a housing 33 which may be of cylindrical form and which includes an outer end wall and an inner end wall 34 detachably secured thereto by any suitable fastening means, such as the screws 35. It is to be understood that the end wall closes the housing 33 with a substantially liquid-tight fit by any suitable means, not shown. However, in the event of seepage of moisture through the joint, the housing 33 is provided with a suitable drainage nipple 36 which may be permanently open, as shown, or provided with any suitable manually-operated valve, not shown. Moreover, the outer end wall and the cylindrical side walls of the housing 33 are slotted, as at 62, to provide ventilation for motor 38. It should be noted that the inner end of the housing 33 is formed with a radially inwardly-directed annular shoulder 37 against which the end wall 34 seats, and through which the screws 35 pass to secure the end wall in place. Any suitable power means, such as the electric motor 38, is located within the housing 33 and supplied with electric current by any suitable means 39 from the exterior of the device. The motor is provided with shaft 40 which extends through end wall 34 axially thereof and is journaled therein for a substantially liquid-tight fit by any suitable bearing and packing means. The end of the shaft 40 extends through the end wall 34 into the casing 10 and has fixed thereon in any suitable manner the hub 42 of a bladed impeller 41, as best seen in Figures 2 and 5. As is readily apparent from those figures, the impeller 41 is located just inwardly of the inlet nipple 12 whereby to draw liquid into the casing 10 through such inlet nipple and discharge the same axially of the impeller into the conical recess provided by the conical screen 29 aforesaid. Thereafter, the liquid is forced through the filter units 21 and 22 into the space provided beyond the filter unit 22 from which point the filtered liquid is discharged from the casing 10 by way of the outlet nipple 13. In the instance of where the device is used to filter and purify and thereafter re-circulate the liquid from an aquarium or the like, suitable fluid-conducting conduits, such as that 16, Figure 2, are connected to the nipples 12 and 13 to draw water from the aquarium, pass it through the casing 10 and return the same to the aquarium. Obviously, where the liquid is not to be re-circulated, the nipple 12 will be connected to the fluid line and the nipple 13 will be connected to a suitable using line. In such an instance, it may be possible to dispense with the use of the pump-providing impeller 41 and the driving means therefor. In such an instance, a conventional closure cap will be threaded onto the threads 32 at the inlet end of the casing 10.

Referring now to Figure 8, a modified form of closure is disclosed, which is adapted to take the place of the closure cap 18. As there disclosed, the closure comprises a substantially cylindrical cup-shaped cap 50, the open end of which is interiorly threaded, as at 51, for threaded engagement with the threads 17 of the casing 10. A discharge nipple 52 is formed in the side wall of the cap 50 to take the place of the discharge nipple 13. In this connection, when the cap 50 is used in place of the cap 18, it is understood that the conduit 16 will be connected to the nipple 52, and that the nipple 13 will be plugged or otherwise suitably closed. The closed end wall 55 of the cap 50 has mounted on the inner surface thereof a suitable sealed heating unit 53. By sealed, it is meant that the unit 53 is protected against the entrance of water to the interior thereof and the unit preferably is heated by electricity supplied thereto by the lead 54 extending through such end wall 55 of the cap 50. Thus, as the filtered liquid approaches the outlet nipple 52, it is heated to any desired degree by the heating unit 53 prior to the liquid being returned to an aquarium or otherwise discharged from the casing 10. The heating unit is particularly desirable in the case of an aquarium where it is desired to maintain the water therein at a temperature higher than room temperature. This is frequently necessary when the aquarium is used to house tropical fish or the like. If necessary, the heating unit 53 may include any suitable thermostatic control means for maintaining the water temperature at a desired degree. Obviously, where there is no necessity to heat the water or liquid passing through the device, the cap 53 may be removed and the regular cap 18 substituted therefor.

While I have shown and described what is now thought to be preferred embodiments of the invention, it is to be understood that the same is susceptible of other forms and expressions. Consequently, I do not limit myself to the precise structures shown and described above except as hereinafter claimed.

I claim:

1. A liquid filter comprising a horizontally disposed cylindrical casing open at each end, inlet means positioned adjacent one end of said casing and carried by the latter for introducing liquid into said casing, outlet means positioned adjacent the other end of said casing and carried by the latter for withdrawing said liquid from said casing, a pair of annular ribs mounted within said casing concentrically thereof and fixedly secured to the inner wall of said casing, said pair of ribs being positioned in parallel spaced relation with respect to each other to form a sediment-collecting space therebetween, a cleanout port extending through the wall of said casing and into one side of said sediment-collecting space and mounted for sliding movement longitudinally of said casing, said first filter having the end adjacent said sediment-collecting space in abutting relation with one of said ribs, a second filter positioned in said casing on the other side of said sediment-collecting space and mounted for sliding movement longitudinally of said casing, said second filter having the end adjacent said sediment-collecting space in abutting relation with the other of said ribs, a closure cap for closing said one end of said casing, closure means embodying a housing for closing the other end of said casing, and circulating means disposed within said housing and the adjacent end of said casing for circulating said liquid from said inlet means to said outlet means.

2. A liquid filter comprising a horizontally disposed cylindrical casing open at each end, inlet means positioned adjacent one end of said casing and carried by the latter for introducing liquid into said casing, outlet means positioned adjacent the other end of the casing and carried by the latter for withdrawing said liquid from said casing, a pair of annular ribs mounted within said casing concentrically thereof and fixedly secured to the inner wall of said casing, said pair of ribs being positioned in parallel spaced relation with respect to each other to form a sediment-collecting space therebetween, a cleanout port extending through the wall of said casing and into said sediment-collecting space, a first filter positioned in said casing on one side of said sediment-collecting space and mounted for sliding movement longitudinally of said casing, said first filter having an end in abutting relation with one of said ribs, a second filter positioned in said casing on the other side of said sediment-collecting space and mounted for sliding movement longitudinally of said casing, said second filter having an end in abutting relation with the other of said ribs, a closure cap for closing said one end of said casing, closure means embodying a housing for closing the other end of said casing, and circulating means disposed within said housing and the adjacent end of said casing for circulating said liquid from said inlet means to said outlet means, said last-named means comprising a rotatable impeller blade positioned intermediate said other end of said casing and said inlet means, and means mounted within said housing and operatively connected to said impeller blade for rotating the latter.

GASTON EDWARD CANTIN, Jr.

REFERENCES CITED

The following references are of record in the file of this patent:

UNITED STATES PATENTS

| Number | Name | Date |
|---|---|---|
| 813,516 | Pfautz | Feb. 27, 1906 |
| 1,168,151 | Bolen | Jan. 11, 1916 |
| 2,086,739 | Reed | July 13, 1937 |
| 2,275,428 | Haldeman | Mar. 10, 1942 |
| 2,335,756 | Haldeman | Nov. 30, 1943 |
| 2,337,893 | Hutterer | Dec. 18, 1943 |

FOREIGN PATENTS

| Number | Country | Date |
|---|---|---|
| 545,584 | France | of 1922 |